April 18, 1933.          LE BONSIEUR          1,904,849
FISHLINE REEL
Filed March 5, 1928
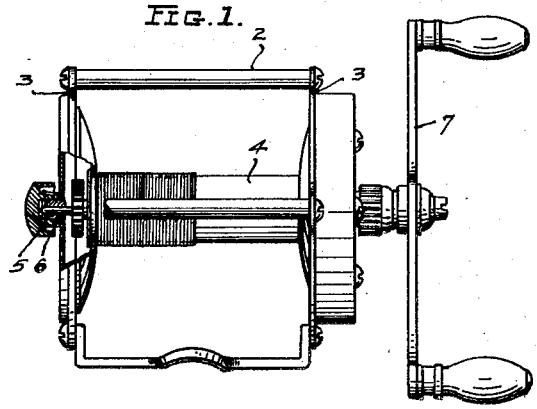
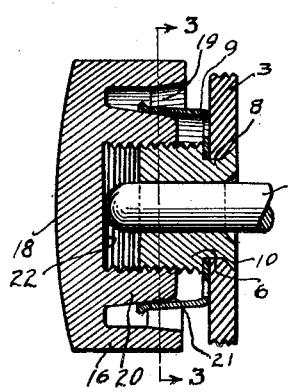
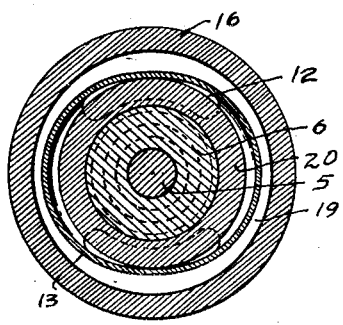
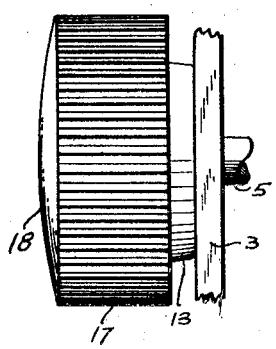
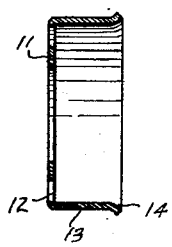
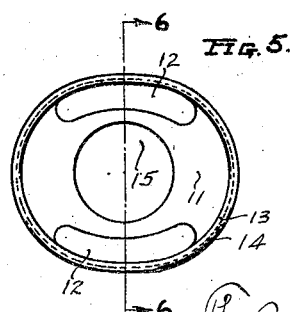
Inventor
Le Bonsieur.
By Frank M. Slough
His Attorney Patented Apr. 18, 1933

1,904,849

UNITED STATES PATENT OFFICE

LE BONSIEUR, OF ELYRIA, OHIO, ASSIGNOR TO THE GENERAL INDUSTRIES COMPANY, OF ELYRIA, OHIO, A CORPORATION OF OHIO

FISHLINE REEL

Application filed March 5, 1928. Serial No. 259,015.

My invention relates to improvements in bearings and more especially to an improved bearing of the type used on fishing line reels to support the spool.

It is desirable in fishing line reels to have an adjustable bearing which is simple in construction and not liable to be affected by extraneous objects such as sand, mud or the like, and a bearing that is easily adjustable and which will retain itself in any adjusted position desired by the operator.

An object of my invention is to provide a bearing which will retain the spool in any adjusted position desired in the reel frame.

Another object of my invention is to provide a bearing of a class described in which greater limits of accuracy in manufacture may be maintained than previously known types.

Another object of my invention is to provide a bearing for fish line reels which is economical and easy to manufacture.

These and other objects of my invention and the invention itself will become more apparent from reference to the following description of certain embodiment thereof and in which description reference will be had to the annexed drawing forming a part of this specification.

Referring to the drawing:

Fig. 1 is an elevational view, with certain parts broken away, of a fish line reel, showing an embodiment of my invention;

Fig. 2 is an enlarged vertical medial sectional view of the device of my invention;

Fig. 3 is a view taken on the line 3—3 of Fig. 2, looking in the direction of the arrows;

Fig. 4 is an enlarged elevational view of the device of my invention;

Fig. 5 is an elevational view of the friction element of my invention; and

Fig. 6 is a view taken on the line 6—6 of Fig. 5, looking in the direction of the arrows.

Referring now to the drawing wherein like parts are designated by like reference characters, I show a fish line reel which comprises a frame 2 having end plates 3 and a spool 4 carried between the end plates and journalled upon a shaft 5 which rotates in a bearing 6 disposed in the end plate. The spool is adapted to receive a fish line thereon and is actuated by a handle 7 and a suitable train of gears, not shown. I contemplate using similar bearings for each end of the shaft, but it is not essential that both bearings be adjustable.

As best shown in Fig. 2, I have shown the lateral bearing 6 threaded at one end and having the opposite reduced end 8 adapted to be inserted in the end plate 3. Before insertion a flexible metallic cup 9 is telescoped over the reduced end. The bearing is then inserted in the end plate and riveted over at 10 retaining the cup firmly against the end plate.

The cup 9, which is made of resilient material, comprises an end wall 11 generally eliptical in form with a flange 13 extending from the periphery thereof and at substantially right angles thereto, having the outer edge 14 flared. A pair of arcuate slots 12 are disposed adjacent the flange 13 and extend transversely across the minor axis of the eliptical wall. Intermediate the flanges and slots is provided a circular perforation 15.

The thrust bearing cap comprises a skirt 16 which is knurled or roughened at 17, extending away from a dome-shaped end wall 18. Within the cap and separated from the outer skirt by an annular groove 19, is provided a centrally disposed internally threaded boss 20, having a substantially frusto-conical outer wall with its largest diameter adjacent the end wall of the cap and having the outer edge 21 rounded, adapted to engage the threaded bearing. The inner end wall 22 of the cap provides a thrust bearing adapted to contact with the end of the shaft 5.

In operation, with the cap about to be screwed upon the bearing, the outer surface of the boss 20 is easily inserted into the cup by means of the rounded edges of the boss and the flaring mouth of the cup, the walls of the cup being disposed within the annular groove and pressing against the inclined surface of the boss.

The circular form of the threaded boss tends to force the resilient eliptical cup walls to circular form adjacent the arcuate slots and by reason of the effort to regain its normal form from the circular form, to which it is distorted, exerts a compressive stress on the exterior walls of the boss, making a frictional resilient contact therewith to hold the cap in any adjusted rotative position on the bearing element 6.

The end wall of the cap engages the rounded end of the shaft 5 and serves as a thrust bearing therefor adapted to take up any lateral movement of the spool between the end plates of the reel.

Having thus described my invention in a preferred embodiment, I am aware that numerous and extensive departures may be made from the embodiment herein illustrated and described but without departing from the spirit of my invention.

I claim:

1. In a fishing reel, a frame comprising an end plate, a spool, a shaft therefor, a bearing for said shaft, said bearing being secured to the plate, a cap having inclined lateral walls of circular transverse section threaded onto the bearing providing a thrust bearing for said shaft, and a cup-like friction member secured against the plate and provided with a resilient skirt frictionally engageable with the inclined walls of the cap, said skirt being curved in transverse sections a portion thereof being of varying radius resiliently resisting distortion into circular form during threading of the cap on the bearing, the end wall of the member having arcuate slits adjacent its side walls.

2. In a fishing reel, a frame comprising an end plate, a spool, a shaft therefor, a bearing for said shaft, said bearing being secured to the plate, a cap having inclined lateral walls of circular transverse section threaded onto the bearing providing a thrust bearing for said shaft, and a cup-like friction member secured against the plate and provided with a resilient skirt frictionally engageable with the inclined walls of the cap, said skirt being curved in transverse sections a portion thereof being of varying radius resiliently resisting distortion into circular form during threading of the cap on the bearing, said member being arcuately slitted intermediate its center and its side wall portions.

3. In a fishing reel, a frame comprising an end plate, a spool, a shaft therefor, a bearing for said shaft, said bearing being secured to the plate, a cap having inclined lateral walls of circular transverse section threaded onto the bearing providing a thrust bearing for said shaft, and a cup-like friction member secured against the plate and provided with a resilient skirt frictionally engageable with the inclined walls of the cap, said skirt being curved in transverse sections a portion thereof being of varying radius resiliently resisting distortion into circular form during threading of the cap on the bearing, said member being slitted intermediate its center and its side wall portions.

4. In a fishing reel, a frame comprising an end plate, a spool, a shaft therefor, a bearing for said shaft, said bearing being secured to the plate, a cap having inclined lateral walls of circular transverse section threaded onto the bearing providing a thrust bearing for the said shaft, and a cup-like friction member engageable with said plate and provided with a resilient skirt frictionally engageable by an interior surface thereof with the inclined walls of the cap, said skirt being curved in transverse sections, a portion thereof being of varying radius resiliently resisting distortion into circular form during threading of the cap on the bearing, the end wall of the member being apertured adjacent its side walls.

5. In a fishing reel, a frame comprising an end plate, a spool, a shaft therefor, a bearing for said shaft, said bearing being secured to the plate, a cap having inclined lateral walls of circular transverse section threaded onto the bearing providing a thrust bearing for said shaft, and a cup-like friction member engageable with said plate and provided with a resilient skirt frictionally engageable by an interior surface thereof with the inclined walls of the cap, said skirt being curved in transverse sections, a portion thereof being of varying radius resiliently resisting distortion into circular form during threading of the cap on the bearing, said member being apertured intermdiate its center and its side wall portions.

6. In a fishing reel, a frame comprising an end plate, a spool, a shaft therefor, a bearing for said shaft, said bearing being secured to the plate, a cap having inclined lateral walls of circular transverse section thereaded onto the bearing providing a thrust bearing for said shaft, and a cup-like friction member engageable with said plate and provided with a resilient skirt frictionally engageable by an interior surface thereof with the inclined walls of the cap, said skirt being curved in transverse sections, a portion thereof being of varying radius resiliently resisting distortion into circular form during threading of the cap on the bearing, said member being slitted intermediate its center and its side wall portions.

In testimony whereof I hereunto affix my signature this 1st day of March, 1928.

LE BONSIEUR.